United States Patent [19]

Fink

[11] Patent Number: 5,289,493
[45] Date of Patent: Feb. 22, 1994

[54] CAVITY MODULATED LINEAR CHIRP LASER

[75] Inventor: David Fink, Los Angeles, Calif.

[73] Assignee: Hughes Aircraft Company, Los Angeles, Calif.

[21] Appl. No.: 871,887

[22] Filed: Apr. 21, 1992

[51] Int. Cl.$^5$ ............................................. H01S 3/083
[52] U.S. Cl. .......................................... 372/94; 372/93; 372/99; 372/100; 372/92
[58] Field of Search .................. 372/93, 94, 99, 100, 372/92

[56] References Cited

U.S. PATENT DOCUMENTS

| | | | |
|---|---|---|---|
| 4,099,141 | 7/1978 | Leblanc et al. | 372/93 |
| 4,292,602 | 9/1981 | Bergqvist | 372/94 |

FOREIGN PATENT DOCUMENTS

| | | | |
|---|---|---|---|
| 0086580 | 3/1989 | Japan | 372/94 |
| 8702197 | 4/1987 | PCT Int'l Appl. | 372/94 |

*Primary Examiner*—Georgia Y. Epps
*Attorney, Agent, or Firm*—Michael W. Sales; Wanda K. Denson-Low

[57] ABSTRACT

A laser configuration is disclosed that generates linear, repeatable, and one-directional frequency modulated chirps by means of a laser cavity whose effective length is varied by employing a combination of a moving special optical element that engages the laser beam twice on each pass of the laser beam through the cavity plus other optical elements such that the laser beam is returned back upon itself, thus rendering ineffective certain errors of position or orientation associated with the motion of the special optical element that otherwise would disturb the established optical alignment of the laser cavity. Equivalent results are obtained with a ring laser by applying similar and corresponding optical features.

23 Claims, 5 Drawing Sheets

CAVITY MODULATED LINEAR CHIRP LASER

BACKGROUND OF THE INVENTION

The operation of radars and laser radars generally is thought of in terms of (a) sending out a pulse and timing the return signal to obtain target range or (b) sending out a wave of constant frequency and measuring the frequency of the return signal to obtain the doppler shift and thereby target velocity. Other waveform modulations also have useful applications. One such waveform modulation is linear frequency modulation (FM), where the frequency of the radar is linearly increased or decreased with time; this is known generally as "FM-chirp." The frequency difference between the target return at any instant and the frequency of the transmitter at the same instant (measured by heterodyning the return with a sample of the transmitter) is related to both the range and velocity of the target. Target velocity affects the frequency difference through the doppler shift; target range affects the frequency difference through the change in transmitter frequency during the round trip transit time. Available methods for separating the effects of range and velocity generally rely on reversing or eliminating the chirp slope for some period of time. There are also applications where there is no need to separate these effects. One such application is when the target travels so slowly that the doppler is small or negligible. Another application is for imaging where the entire target has the same velocity, so that changes in frequency represent relative changes in range. For these applications, a repetitive, one directional chirp is the waveform of choice, and system performance depends on the linearity and repeatability of the chirp and the amount of power transmitted. This invention is a low-loss method of generating linear, repeatable, one-directional chirps from a laser transmitter of an optical radar system.

In the prior art, chirping is achieved by employing an electro-optic crystal modulator within the laser cavity (resonator). The laser optical frequency is modulated when the effective optical length of the crystal is varied in response to a suitably shaped electrical pulse applied to electrodes situated at either side of the crystal. A typical electro-optic crystal is formed from cadmium telluride, 5 cm long, 2 mm by 2 mm in cross section, and highly polished on all surfaces.

Many difficulties are encountered with this prior art approach: The crystals are both expensive and fragile. Optical alignment of such crystals is difficult because of their long, narrow shape. Some inherent characteristics of the crystal itself also affect performance. The imperfect optical quality of such crystals leads to optical distortions and birefringence. Strain-optic effects cause transverse variations in the index of refraction that distort the optical beam and degrade beam quality. Piezoelectric effects produce dimensional changes that generate acoustic waves that might fracture the crystal or introduce additional strain-optic effects. Thermal-optic effects result from absorbed optical energy. Because this absorption is not distributed uniformly throughout the crystal, it causes mechanical strains and index of refraction gradients. Typical insertion loss resulting from placing such a crystal into the cavity is about a ten to twelve percent round trip loss.

To operate effectively, a high voltage ramp (0 to 1600 volts) swept at periods of 3 to 50 microseconds must be applied. Arcing and flashover either across the crystal or to adjacent elements must be avoided. As will be explained subsequently, excessive optical length introduced into the laser cavity by such a crystal significantly limits the maximum total range of chirp modulation that can be achieved.

Chirp linearity and repeatability limit the resolution and signal-to-noise ratio of the radar system. Linearity of a system employing an electrooptic crystal depends mainly on linearity of the voltage ramp as a function of time plus dynamic disturbances that alter the index of refraction. These disturbances result from piezo-electric and strainoptic effects. Birefringence and gradients in the index of refraction induced by heat and strain also degrade linearity of the optical frequency chirp. Similarly, repeatability of the chirp slope depends on the repeatability of the voltage drive, dynamic strain-optic effects, and temperature dependence of the electro-optic coefficient. With crystal modulators, deviations from linearity of the chirp ramp can be held to one percent. Chirp slope can be held constant to within one percent from chirp to chirp.

The use of this invention can improve chirp slope linearity by about two orders of magnitude. Chirp slope repeatability will be about the same as in the prior art. It is important to note, however, that variations in slope repeatability resulting from the use of this invention are systematic and known, while variations of the prior art are essentially unpredictable. In many cases, known and systematic variations can be compensated for, which will yield laser radar performance improvements similar to what could be obtained from improving slope repeatability by one or two orders of magnitude.

SUMMARY OF THE INVENTION

With this invention, laser chirping is achieved without employing an electro-optic crystal. In one embodiment of this invention, chirping is achieved by varying the optical length of the laser cavity by translating a refracting prism across the laser beam within the laser cavity. A critical feature is that as laser light traverses the length of the cavity, it passes through the prism, reflects from a cube corner retroreflector, and then passes through the prism a second time. In other words, the laser beam path is twice engaged by the prism. When this critical double-pass feature is employed, certain errors and variations in position or angular orientation of the prism can be tolerated and are rendered ineffective without degrading the original laser alignment. In other embodiments of this invention, a mirror rather than a prism is translated across the laser beam, but as will be described for these embodiments, the double-pass feature retains the ability to tolerate changes in angular orientation of the translating mirror. Through application of this invention, chirps are produced with low energy loss, exhibit a linear variation of frequency as a function of time, and are repeatable from chirp to chirp. The chirps also are one-directional; that is, the frequency of all generated chirps either increases or decreases uniformly as a function of time. A further advantage of this invention is that relative to the prior art, the total optical length of the laser cavity is reduced. As a result, a larger laser free spectral range is obtained, and therefore a larger chirp frequency bandwidth is permitted. Thus using these novel features, linear and repeatable chirping is achieved with embodiments that are superior to the prior art with respect to optical beam quality, optical power, and optical frequency control.

BRIEF DESCRIPTION OF THE DRAWINGS

The advantages and novel features of the disclosed invention will be appreciated readily by persons skilled in the art from the following detailed description when read in conjunction with the drawings herein.

FIG. 1 illustrates the basic invention. Certain features that are included in this figure for the sake of conceptual clarity are modified in subsequent figures without altering the essence of the invention.

FIG. 2 further illustrates the basic invention but in a more realistic configuration. The arrangement of the components permits more efficient use of a prism of given length.

FIG. 3(a-c) illustrates conditions in the laser cavity that control selection of particular modes and frequencies of laser operation.

FIG. (a-b) shows a practical configuration of this invention in which refracting prisms are mounted on the face of a spinning wheel, so that a continuous chirping sequence is produced.

FIG. 5(a-c) is a diagram showing deviation of the laser beam resulting from a single prism passing through the beam in the configuration of FIG. 4.

FIG. 6 shows a practical configuration of this invention in which refracting prisms are mounted on the rim of a spinning wheel, so that chirping is produced continuously.

FIG. 7(a-b) is a diagram showing deviation of the laser beam resulting from a single prism passing through the beam as would occur in the configuration of FIG. 6.

DETAILED DESCRIPTION OF THE DISCLOSURE

In the following detailed description and in the several figures provided, like elements are identified with like reference numerals.

In a chirped laser, chirping is achieved by repeatedly varying the optical length of the laser cavity in a suitable and carefully controlled manner. In one embodiment of this invention, optical length of the cavity is varied by translating a conventional refracting prism (with faces that are essentially flat) across the light beam within the cavity. This prism is a special optical element within the laser cavity that is vital to the performance of the invention. A critical double-pass feature of this invention as applied to this embodiment is that as the laser beam traverses the length of the cavity, it passes through the moving prism twice, with the entering ray of the second pass exactly parallel to the exiting ray of the first pass. In other embodiments of this invention to be described later, a related double-pass feature with a reflecting special optical element is employed.

Figures 1, 2:
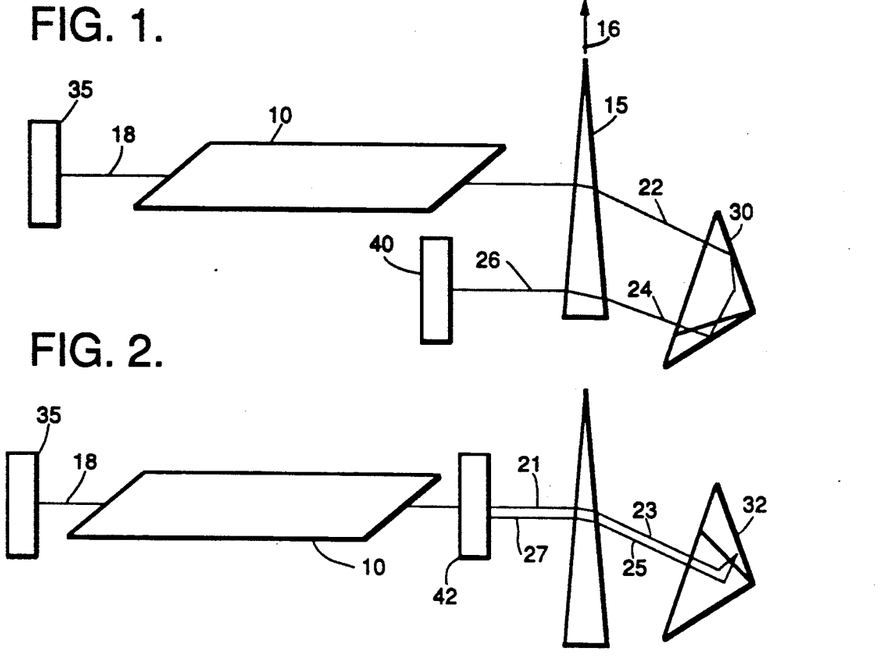

FIG. 1 illustrates one embodiment of the basic invention. The laser optical cavity includes all the elements shown, from output mirror 35 to end mirror 40. The laser light beam 18 leaves the laser body 10 along ray 20 and passes through the prism 15. As the prism is translated in the direction of arrow 16, the optical length of the cavity varies appropriately to produce the desired chirp effect. Engaged by prism 15, the laser beam is deviated into ray 22 that impinges upon cube corner retroreflector 30, which is located optically between the two engagements of the laser beam with prism 15 (the special optical element) and which reflects an entering beam exactly parallel to the entering direction. As a result, ray 24 is parallel to ray 22 as it re-enters prism 15. The resulting exiting ray 26 is exactly parallel to original ray 20. An entering beam is deviated by a prism according to its angle of incidence and the fixed parameters of the prism (i.e., from its geometry and index of refraction). Thus, since rays 22 and 24 are parallel, it follows that rays 20 and 26 also are parallel. Back end mirror 40 is aligned perpendicularly to ray 26 and returns the beam back to laser body 10.

To review, as a result of these operations, the laser beam that originally exited laser body 10 has been returned to laser body 10 through all optical components exactly along the same path. In other words, the beam has been returned back upon itself. Front end mirror 35 is partially reflecting and allows a fraction of the laser light to be emitted from the cavity.

The essence of the invention and its significant advantages can now be shown. As a result of the arrangement described in FIG. 1, prism 15 can be misaligned (within certain limits) with respect to position or orientation in essentially any manner and can produce any angle of deviation—even out of the plane of the figure—without disturbing the established alignment of the laser. In particular, ray 26 remains perpendicular to end mirror 40. In other words, the previously established cavity alignment is retained for any angular misalignment of prism 15. (Some obvious limits occur such as, for example, the prism cannot be moved so far as to fail to intercept a beam within the cavity.) Therefore, the mechanism or means that translates the prism need not maintain precise prism alignment during that translation, as would be required without employing the cube corner and the double-pass of the prism feature (that is, if end mirror 40 were placed in ray 22). The laser cavity must be aligned initially by aligning end mirror 40 perpendicularly to ray 26. Once alignment is established, however, misalignments in position or orientation of prism 15 that might occur as it is translated will not disturb the existing alignment of the laser cavity.

FIG. 2 illustrates a configuration similar to that shown in FIG. 1 except that positions of the cube corner and the back end mirror have been altered to improve utilization of a given prism length. Some features of FIG. 2 must be explained to avoid confusion. Similarly to FIG. 1, laser light leaves laser body 10 as ray 21 to enter prism 15 and is deviated into ray 23. Cube corner 32 is oriented so that retro-reflected ray 25, while still parallel to ray 23, lies in a plane essentially perpendicular to the plane of FIG. 2. The small displacement between rays 23 and 25 is shown only for explanatory clarity and has no other significance. Ray 25, however, is displaced from ray 23 in the said perpendicular plane by the action of cube corner 32. Ray 25 enters prism 15 as before and leaves this prism as deviated ray 27. Rays 21 and 27 are parallel to each other and lie in a plane essentially perpendicular to the plane of the figure; the small displacement shown between these rays is for clarity only and has no other significance. Ray 27 is displaced from ray 21 in the said perpendicular plane. The displacements in the said perpendicular plane and out of the plane of the figure described for rays 25 and 27 permit back end mirror 42 to be placed appropriately so as to intercept ray 27 and so that ray 21 will not be intercepted as it passes behind this mirror. After ray 27 is retro-reflected from mirror 42, the beam returns through all components exactly along the same path to laser body 10. Displacing rays 25 and 27 as in FIG. 2 rather than as rays 24 and 26 in FIG. 1 permits more efficient use of prism 15 because a given prism length in the direction of translation can be employed more effectively.

The free spectral range (FSR) of a resonator is the frequency separation between adjacent longitudinal modes. A laser resonator can operate at any of its longitudinal mode frequencies. For homogeneously broadened gain media (as in a carbon dioxide waveguide laser), the mode that will laser is that longitudinal mode frequency having the highest gain and is determined by the gain of the medium. Changing the optical length of the resonator tunes the longitudinal modes and thereby the operating frequency. The free spectral range is also the tuning range available for chirping. FSR is given by $FSR = c/2L$, where c is the velocity of light, and L is the optical length of the resonator. Resonator construction and layout are important features because a shorter resonator length allows a greater FSR.

Figure 3A:
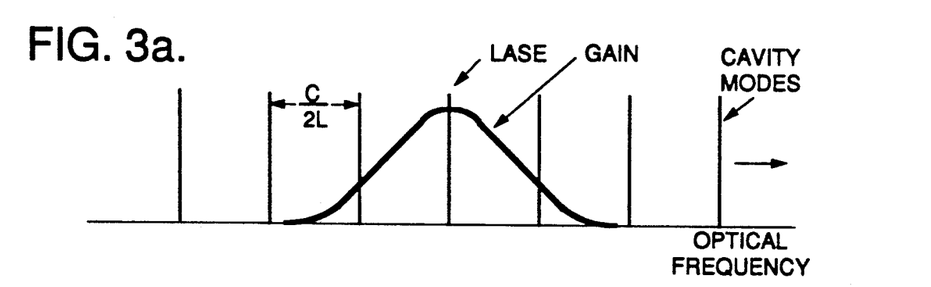
Figure 3B:
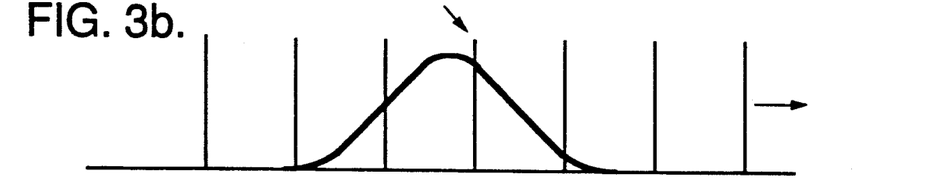
Figure 3C:
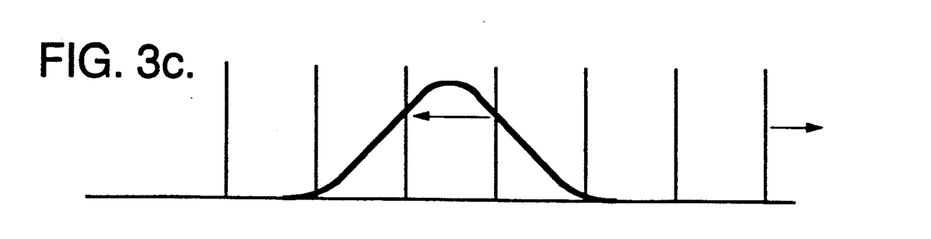

FIG. 3 illustrates tuning of longitudinal modes to sweep out one FSR. Intervals of FSR are shown as vertical lines that represent cavity modes. The gain curve is shown (3a) with a cavity mode initially at a peak value. As the resonator length is altered, the lasing mode moves to the right (3b). At the point represented by FIG. 3c, the lasing action transfers to the adjacent mode, because that mode now has a larger gain.

A laser chirps its full FSR each time the optical length of the resonator changes by $\frac{1}{2}$ wavelength. Translation of a prism across the laser beam (as indicated in FIGS. 1 and 2) produces many such changes by altering the index of refraction along a segment of the optical path. Exchanging an incremental length of free space with the same length of material having an index of refraction of n increases the optical length of the resonator correspondingly by $n-1$ times the length of the increment. Consider a prism made of germanium (index of refraction of 4) operating in the cavity of a carbon dioxide laser radiating at 10.6 micrometers. An incremental change in the instantaneous operating thickness of the portion of the germanium prism within the laser beam increases optical resonator length by three times the length of the increment. For example, if prism thickness is increased by 2 mm, then for two passes through the prism, the physical length of the beam segment within the prism is increased by 4 mm, but optical length is increased by three times 4 mm or 12 mm. Since one chirp is generated for each half wavelength change in resonator length (that is, for each 5.3 micrometers), the original 2 mm increase in prism thickness produces a sequence of 2264 chirps.

Figure 4A:
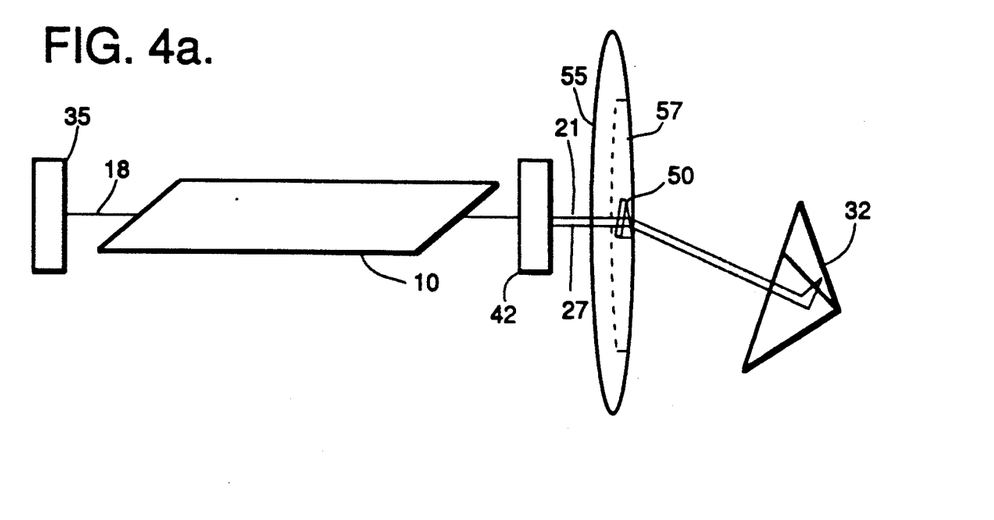
Figure 4B:
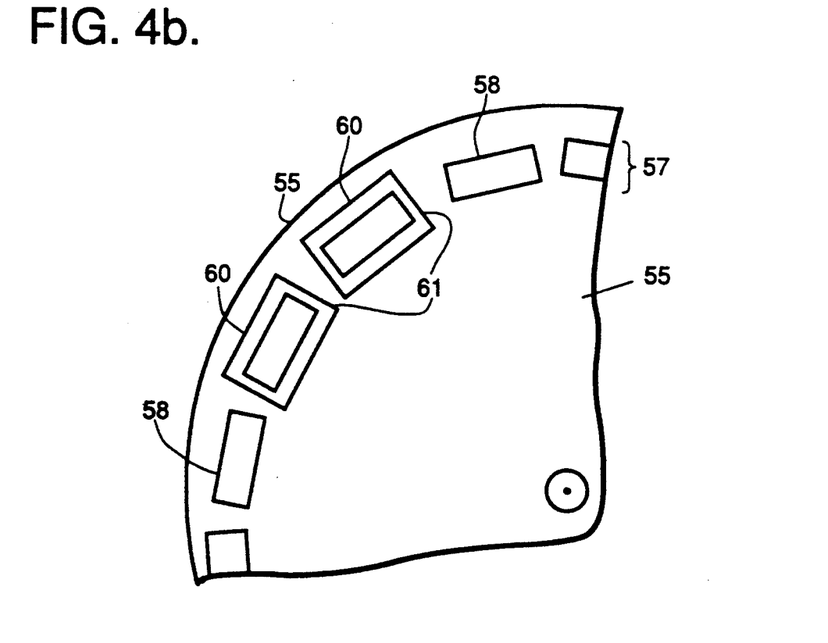

FIG. 4 shows an embodiment of this invention that employs basic features of FIG. 2 to produce a practical chirped laser configuration. The single prism of FIG. 2 is replaced with a plurality of prisms (serving as the special optical element) suitably oriented and attached to the outer rim or annular region on the periphery of a rotating wheel. The back end mirror and the cube corner retroreflector remain essentially the same as in FIG. 2. As the wheel spins, a continuous sequence of prisms traverses the laser beam and produces a corresponding continuous sequence of chirps. As one prism moves out of the laser beam, it is replaced by the next prism along the periphery of the wheel. With this arrangement, the changes in resonator length that produce chirping are introduced automatically and continuously.

In FIG. 4a, typical prism 50 in the laser beam is attached to wheel 55, which contains the plurality of prisms and which spins at constant speed. Annular region 57 of the wheel crosses the laser beam. Otherwise the configuration of the cavity is similar to that shown in FIG. 2. FIG. 4b illustrates in detail the arrangement of the plurality of prisms on a partial periphery of wheel 55. Slots 58 divide annular region 57 and allow passage of the laser beam. Typical prisms 60 are shown as rectangles over two typical slots. Sides 61 of the rectangles represent the thicker edges of these typical prisms.

Arranging prisms on the periphery of a spinning or rotating wheel introduces two effects not present with the ideal linear displacement of prism 15 as shown in FIG. 2. One effect is a change in the direction of the refracted beam; this results from rotation of the prism as it traverses the laser beam in a circular path on the periphery of the wheel. The other effect is a change in the chirp rate resulting from nonlinear variation in the instantaneous operating thickness of the prism as a function of time, which results from prism motion along a circular path.

Rotating the prism in a plane perpendicular to the laser beam introduces a deviation in the direction of beam 23. Without the cube corner, double-pass arrangement, such beam deviations within the cavity would seriously disturb alignment and would prevent laser action. With the use of this invention, however, such deviations are fully compensated, and the laser remains aligned.

Figures 5A, 5B, 5C, 6:
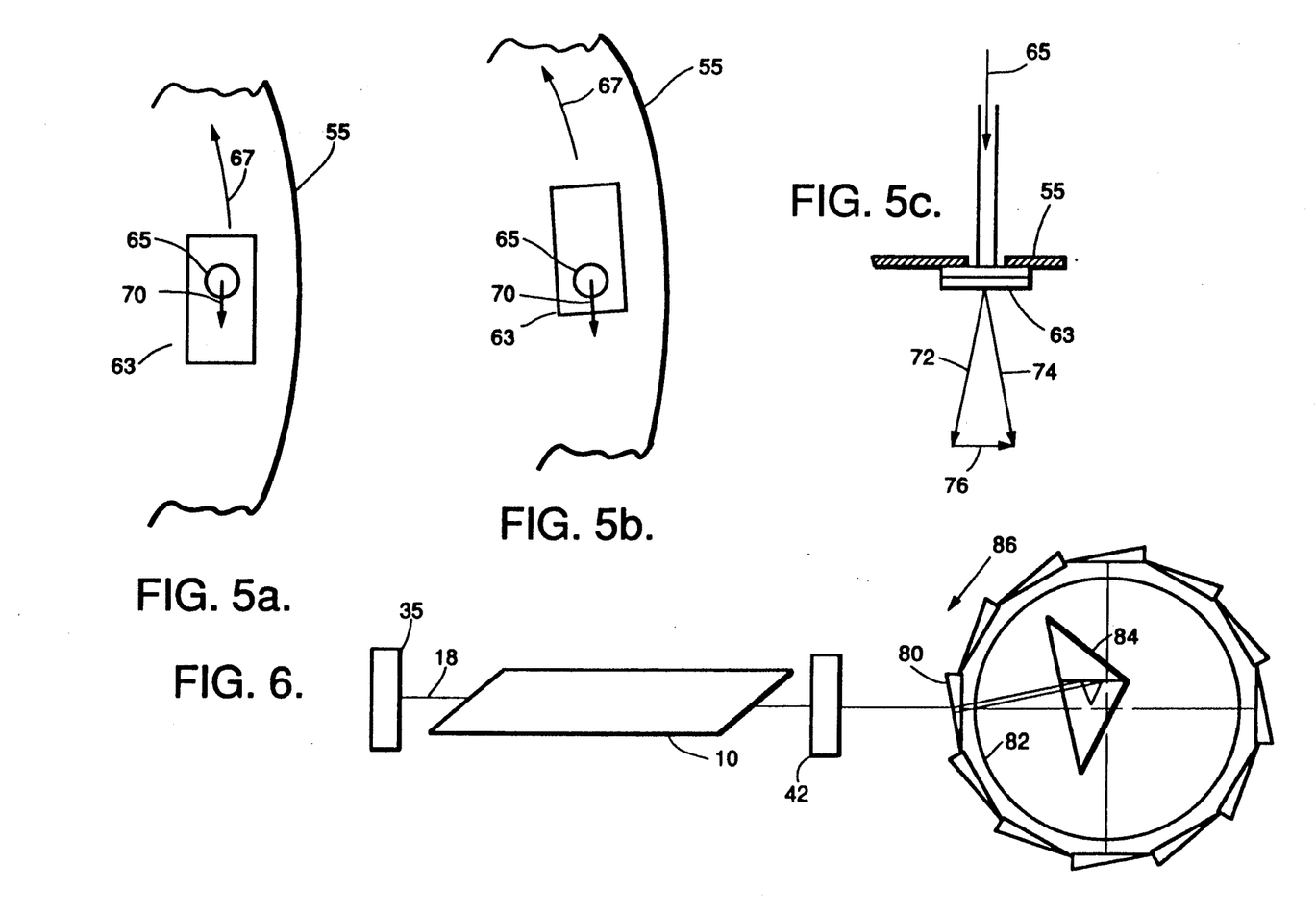

FIG. 5 illustrates this feature in detail by showing how beam deviation is introduced with rotation of a prism as it passes through the laser beam. FIG. 5a shows a front view of the situation as typical prism 63 attached to wheel 55 enters the laser resonator and crosses laser beam 65. Arrow 67 represents the circular prism path as wheel 55 rotates. Arrow 70 represents the instantaneous direction of deviation of the light by the prism. FIG. 5b shows a front view of the corresponding situation as the prism leaves the laser resonator, with arrow 71 representing the instantaneous direction of deviation of the light by the prism. The velocity of that portion of the prism intercepting laser beam 65 is always vertical in this figure, but the deviation angle changes because the prism orientation rotates as the prism passes across the beam. FIG. 5c is a top view of FIGS. 5a and 5b, showing the transmitted beam directions and the corresponding change in alignment. FIG. 5c also provides additional detail showing a typical slot in wheel 55 where typical prism 63 is mounted and which allows laser beam 65 to pass through. Vector 72 represents the direction of the transmitted laser beam corresponding to FIG. 5a. Vector 74 represents the direction of the transmitted laser beam corresponding to FIG. 5b. Vector 76 is the net change in beam direction (change in deviation) that occurs between FIGS. 5a and 5b. The change in beam deviation can be calculated. A typical prism would be made of germanium (index of refraction at 10.6 $\mu$m = 4.0) and have a prism angle of about 5°, yielding a deviation angle of 15°. If there are 16 prisms on the wheel, each prism is used for about 22° of wheel rotation, and each prism therefore rotates through 22° while it intercepts the beam. The deviation change is $$2(15°)\sin(22°/2) = 5.7° = 100 \text{ mrad}$$

This value far exceeds usual resonator tolerances, which are on the order of 0.5 mrad for a waveguide laser and less for free-space lasers. But with the use of this invention, the change in deviation is totally compensated and the laser remains aligned.

Only the prism thickness through which the beam passes instantaneously lies effectively within the cavity and is able to change resonator path length. As the prism is displaced, the chirp rate responds to rate of change of thickness of this component. Any variation in the linearity of this thickness component as a function of time introduces a corresponding non-linearity in the chirp.

The chirp rate changes because only the component of thickness gradient parallel to prism velocity at the location of the laser beam causes a change in resonator optical path length. As the prism rotates, the gradient of thickness (parallel to the deviation vector in FIG. 5) moves in and out of parallelism with the velocity vector (always vertical in FIG. 5). For practical cases, however, the change in chirp rate (slope) is small. For a system employing 16 prisms on the wheel, the fractional change in chirp slope between a chirp at the center of a prism and a chirp at an end of a prism is approximately $$1 - \cos(22°/2) = 0.018 = 1.8 \text{ percent.}$$

For a homodyne optical radar system, a change in chirp slope of 1.8 percent will have little effect. In a homodyne system, the local oscillator (or reference) is derived from a portion of the transmitted beam. Thus at any instant, the local oscillator beam and the received beam are derived from the same chirp or from temporally nearby chirps and therefore have the same chirp slope. The exact value of the beat frequency detected for a target at any particular range and velocity does change slightly as the chirp slope is changed. For some radar systems, this change may have to taken into account.

The change in chirp slope during one chirp also can be calculated. The angular rotation of the carrier wheel to generate one chirp is 22° per prism divided by 2264 chirps per prism, or about 0.01° per chirp. The worst case is for a chirp at the end of a prism. The fractional change in slope during a chirp at the end of a prism is $$1 - \cos(22°)/\cos(22.01°) = 0.007 \text{ percent,}$$

which is completely negligible.

A plurality of prisms (serving as the special optical element) also may be placed on the outer face or cylindrical rim of a spinning wheel as shown in FIG. 6. As the prisms pass sequentially across the laser beam, a corresponding sequence of chirps is produced. In FIG. 6, front end mirror 35, laser body 10, and back end mirror 42 are similar to those in FIG. 4, but here the cube corner retroreflector 84 is located inside wheel 82. The laser beam passes through typical prism 80 mounted on wheel 82 and then to cube corner 84. Wheel 82 spins as indicated by arrow 86. (Retroreflector 84 is not attached to wheel 82 and does not spin with it.)

Figure 7A:
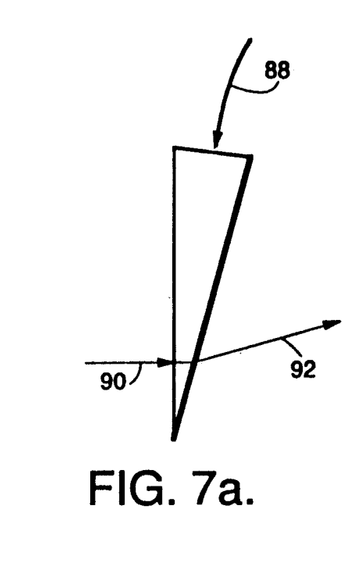
Figure 7B:
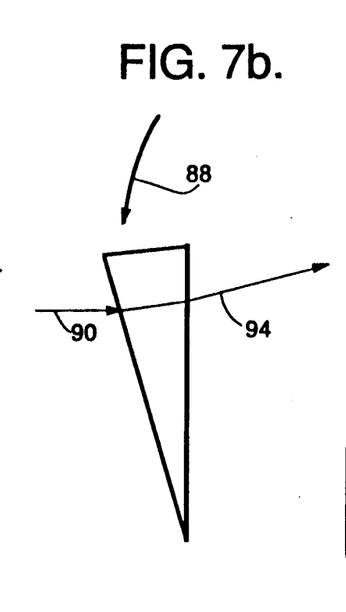

As each prism on the wheel moves through the resonator in the direction indicated, its thickness in the optical path increases. Wheel motion also causes a tilt in the orientation of the prism, which is in contrast to the ideal linear translation shown in FIGS. 1 and 2. This tilt changes the angle of incidence on the prism, which changes the beam deviation and adds some excess optical thickness, as shown in FIG. 7. With the use of this invention, beam deviation is fully compensated, and the laser remains aligned. The excess change in thickness is very small and actually is less than that produced from the configuration of FIG. 4.

FIG. 7 illustrates the changes in laser beam deviation for the configuration of FIG. 6 as the prism translates across the laser beam in the resonator. Arrow 88 indicates the direction of wheel rotation. FIG. 7a shows laser beam 90 being deviated into beam 92 as the prism enters the laser resonator. FIG. 7b shows beam 90 being deviated into beam 94 as the prism leaves the laser resonator.

Figure 8:
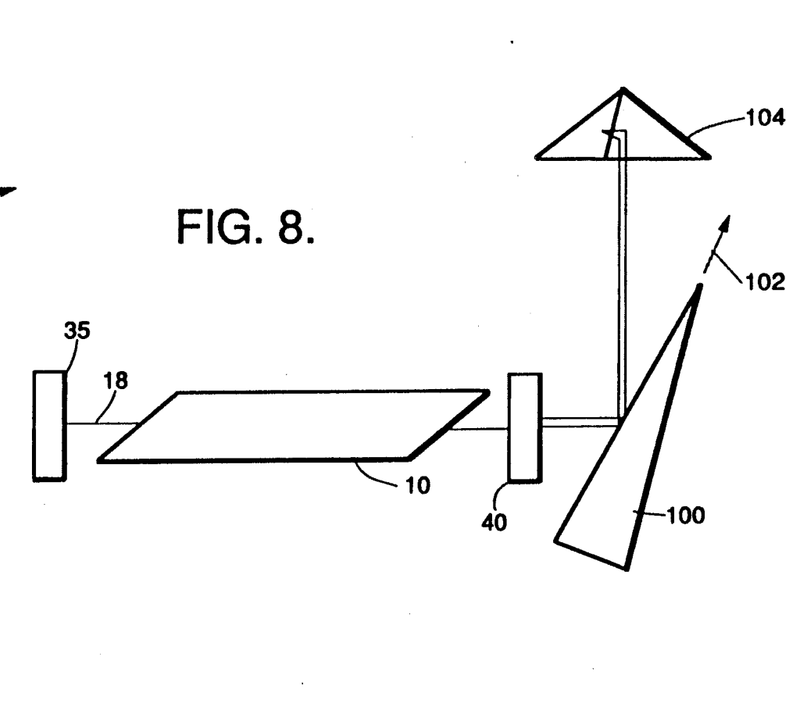
FIG. 8 shows the essential invention when a linearly translated reflecting wedge is substituted for the refracting prism employed in the configuration of FIG. 1.

Previously described embodiments of this invention employ refracting prisms to vary the optical resonator length as required to generate chirps. Reflecting prisms or wedges (which are essentially inclined mirrors) may also be used and can serve as the special optical element required for this invention to vary the optical length of the laser cavity in a controlled manner. For these embodiments, the double-pass feature that is vital to this invention is maintained by reflecting off the moving wedge twice (i.e the wedge engages the laser beam twice), with a cube corner retroreflector used between the two wedge reflections. In prior art implementations of moving mirrors, bearing wobble is a serious problem, because the effect of any wobble of the mirror is doubled upon reflection and then injected into the optical alignment. The double-pass and cube corner configuration of this invention cancels out bearing wobble. FIG. 8 illustrates an ideal embodiment for the reflective version of this invention in which wedge 100 is translated uniformly across laser beam 18 in the direction of arrow 102. Cube corner 104 is relocated as shown to handle the changed path of the laser beam that results from reflection. FIG. 8 is analogous to the elementary refractive version of FIG. 1.

Figure 9:
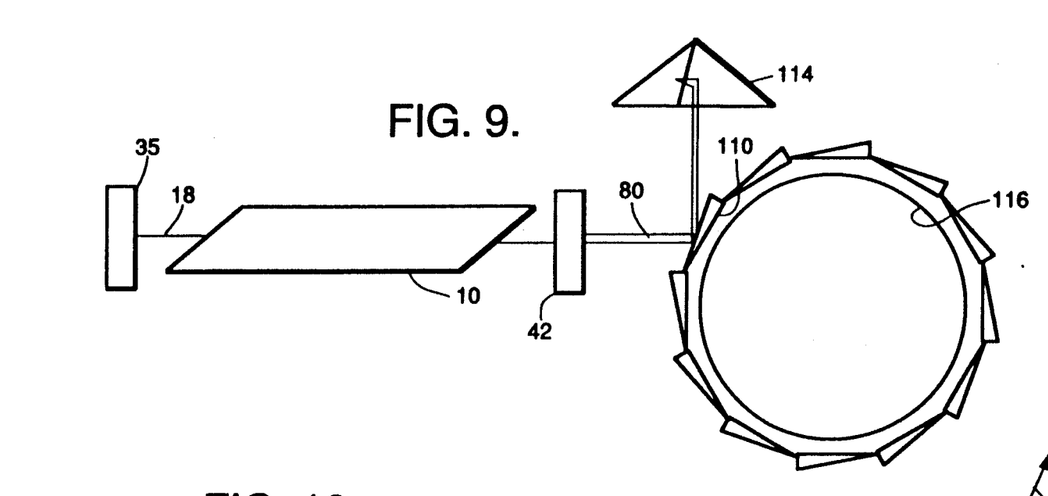
FIG. 9 shows a practical configuration of this invention in which reflective wedges (mirrors) are mounted on the rim of a spinning wheel, so that chirping is produced in the form of a continuous sequence.

With the deleterious effects of wobble removed, a version of this invention analogous to that of FIG. 6 can be implemented using reflecting wedges. FIG. 9 illustrates a practical configuration employing a plurality of reflecting wedges mounted on the rim of spinning wheel 116. Typical wedge 110 reflects the laser beam to cube corner 114. A reflective analog to FIG. 4 also can be constructed with the wedges located on the annular rim of a spinning wheel.

A small amount of nonuniformity in the rate of change of path length is introduced with the configuration of FIG. 9 as a wedge rotates when passing through the laser beam. The effect can be minimized by using a large number of relatively small wedges.

All configurations of this invention previously illustrated or described also can be implemented employing suitably oriented diffraction gratings in the laser cavity. A grating can be used in place of either back end mirror 40 or front end mirror 35, while still maintaining the essence of this invention.

Figure 10:
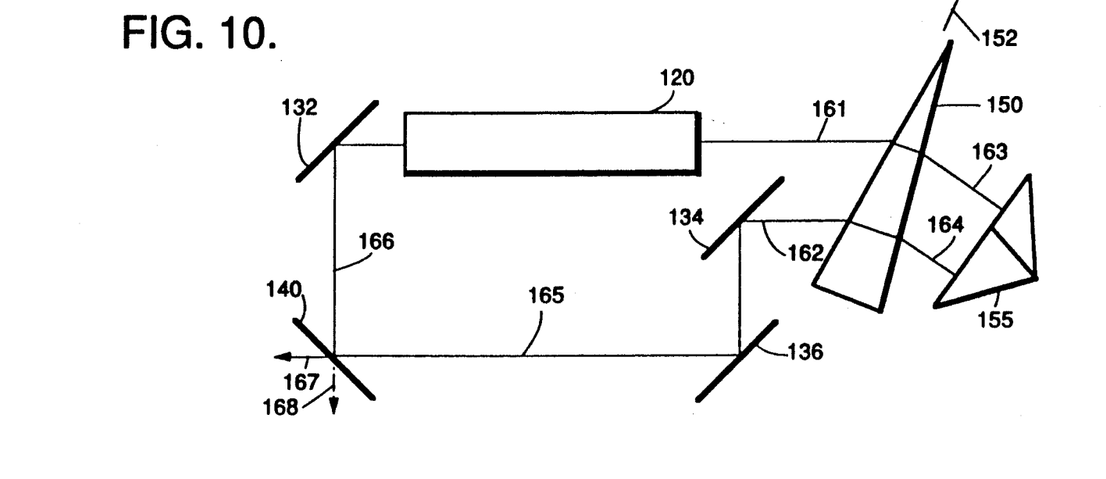
FIG. 10 shows a typical embodiment of this invention in a ring laser.

The double-pass configuration involving the special optical element in combination with other optical elements that is vital to this invention also can be employed in a typical ring laser, as is illustrated in FIG. 10. For a laser beam traversing the ring (or loop) in a clockwise sense, laser body 120 emits laser beam 161, which engages refracting prism 150 (the special optical element). This prism is translated in the direction of arrow 152. Ray 163, shown leaving the prism, enters cube corner retroreflector 155, which in turn emits ray 164, which is parallel to ray 163. Ray 162 shown leaving the prism is parallel to ray 161. Folding mirrors 132, 134, 136, and 140 complete the loop (i.e., direct the laser beam back to the laser body) for this typical ring laser configuration. Mirror 140 is the output coupler that is partially reflecting and partially transmitting to allow for emission of output energy.

Many other forms of ring lasers can be adapted for use with this invention. In a ring laser, the beam can traverse the loop in either the clockwise or counterclockwise sense, or beams may be traversing the loop in both senses simultaneously. At the output coupler, solid arrow 167 indicates the output for the clockwise sense, and dotted arrow 168 corresponds to the counter-clockwise sense. All of the advantages described previously relating to the manner in which this invention deals effectively with misalignments of the special optical element apply to ring laser configurations. Because the path of the laser beam is a loop, however, the feature of previously described embodiments in which the laser beam is returned back upon itself does not occur in a ring laser. In a manner similar to that described for the previous embodiments, one or more suitably oriented diffraction gratings can be introduced suitably into the ring laser cavity as replacements for folding mirrors.

In a manner similar to that described for the previous embodiments, a plurality of refracting prisms or a plurality of reflecting wedges can be mounted on either the annular or circumferential rim of a spinning wheel that is placed within the ring laser cavity so as to produce a continuous sequence of chirps.

What is claimed is:

1. A laser that generates frequency modulated chirps that are essentially linear, repeatable, and one-directional by means of a laser cavity (resonator) whose effective optical length is varied with a special optical element within said laser cavity that engages the laser beam twice on each pass of the laser beam through the resonator and that, with a cube corner retroreflector placed optically between the said two engagements with the said special optical element, and in combination with other optical elements, returns said laser beam back upon itself, thus rendering ineffective certain errors and variations of position or orientation associated with said special optical element that otherwise would disturb the established optical alignment of the said laser cavity.

2. The said laser cavity of claim 1, which contains both a front end mirror and a back end mirror, and in which said special optical element is a refracting prism that is translated essentially uniformly across said laser beam.

3. The laser cavity of claim 1 in which the said other optical elements within said laser cavity include both a front end mirror and a back end mirror.

4. The said laser cavity of claim 2 wherein the said special optical element is a plurality of refracting prisms mounted on the annular rim of a wheel such that when said wheel is rotated, each of said prisms is translated sequentially across the said laser beam to produce a continuous sequence of chirps.

5. The laser cavity of claim 4 in which the said other optical elements within said laser cavity include both said front end mirror and said back end mirror.

6. The said laser cavity of claim 2 wherein the said special optical element is a plurality of refracting prisms mounted on the outer cylindrical rim of a wheel such that when said wheel is rotated, each of said prisms is translated sequentially across said laser beam to produce a continuous sequence of chirps.

7. The laser cavity of claim 6 in which the said other optical elements within said laser cavity include both said front end mirror and said back end mirror.

8. The said laser cavity of claim 1, which contains both a front end mirror and a back end mirror, and in which said special optical element is a reflecting wedge that is translated essentially uniformly across the said laser beam.

9. The laser cavity of claim 8 in which the said other optical elements within said laser cavity include both said front end mirror and said back end mirror.

10. The said laser cavity of claim 8, wherein the said special optical element is a plurality of reflecting wedges mounted on the annular rim of a wheel such that when said wheel is rotated, each of the said wedges is translated sequentially across said laser beam to produce a continuous sequence of chirps.

11. The laser cavity of claim 10 in which the said other optical elements within said laser cavity include both said front end mirror and said back end mirror. either said front end mirror or said back end mirror is replaced with a suitably oriented diffraction grating.

12. The said laser cavity of claim 8 wherein the said special optical element is a plurality of reflecting wedges mounted on the outer cylindrical rim of a wheel such that when said wheel is rotated, each of said wedges is translated sequentially across said laser beam to produce a continuous sequence of chirps.

13. The laser cavity of claim 12 in which the said other optical elements within said laser cavity include both said front end mirror and said back end mirror.

14. The said laser cavity of claim 2 in which either said front end mirror or said back end mirror is replaced with a suitably oriented diffraction grating.

15. The said laser cavity of claim 8 in which either said front end mirror or said back end mirror is replaced with a suitably oriented diffraction grating.

16. A ring laser that generates frequency modulated chirps that are essentially linear, repeatable, and one-directional by means of a ring laser cavity (resonator) whose effective optical length is varied with a combination of a special optical element that engages the laser beam twice on each pass of the said laser beam through the said ring laser cavity plus a cube corner retroreflector within said ring laser cavity, said cube corner retroreflector being placed optically between the said two engagements of the said special optical element, with the result that certain errors of position or orientation associated with said special optical element, that otherwise would disturb the established optical alignment of said laser cavity, are rendered ineffective.

17. The ring laser cavity of claim 16 which includes folding mirrors that direct said laser beam so as to close the ring of the said ring laser cavity and an output coupler that allows emission of output energy.

18. The ring laser cavity of claim 16 in which the said special optical element is a refracting prism that is translated across the said laser beam.

19. The ring laser cavity of claim 16 wherein the said special optical element is a plurality of refracting prisms mounted on the annular rim of a wheel such that when said wheel is rotated, each of the said prisms is translated sequentially across said laser beam to produce a continuous sequence of chirps.

20. The ring laser cavity of claim 16 in which said special optical element is a reflecting wedge that is translated essentially linearly across the said laser beam.

21. The ring laser cavity of claim 20 wherein that the said special optical element is a plurality of reflecting wedges mounted on the annular rim of a wheel such that when said wheel is rotated, each of the said wedges is translated sequentially across said laser beam to produce a continuous sequence of chirps.

22. The laser cavity of claim 20 wherein the said special optical element is a plurality of reflecting wedges mounted on the outer cylindrical rim of a wheel such that when said wheel is rotated, each of said wedges is translated sequentially across said laser-beam to produce a continuous sequence of chirps.

23. The laser cavity of claim 17 in which one or more of said folding mirrors is replaced with a suitably oriented diffraction grating.

* * * * *